United States Patent
Tabata et al.

(10) Patent No.: US 6,879,417 B1
(45) Date of Patent: Apr. 12, 2005

(54) COLOR IMAGE PROCESSING APPARATUS THAT PERFORMS COLOR CONVERSION PROCESSING

(75) Inventors: Sunao Tabata, Yokohama (JP); Hiroyuki Fuse, Kawasaki (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,950

(22) Filed: Mar. 9, 2000

(30) Foreign Application Priority Data

Mar. 23, 1999 (JP) .......................................... 11-077954

(51) Int. Cl.⁷ ................................................ G03F 3/08
(52) U.S. Cl. ...................... 358/529; 358/1.9; 358/2.1; 358/1.16; 358/539; 358/515; 358/448; 382/166; 382/167; 382/233
(58) Field of Search .................. 358/1.9, 2.1, 539, 358/515, 448, 1.16; 382/166, 167, 233

(56) References Cited

U.S. PATENT DOCUMENTS

| | | | | |
|---|---|---|---|---|
| 5,199,081 A | * | 3/1993 | Saito et al. ................ | 382/116 |
| 5,724,440 A | * | 3/1998 | Funada et al. .............. | 382/162 |
| 5,726,778 A | * | 3/1998 | Tanio ........................ | 358/501 |
| 5,732,153 A | | 3/1998 | Ohsawa | |
| 5,911,004 A | * | 6/1999 | Ohuchi et al. .............. | 382/173 |
| 6,009,192 A | * | 12/1999 | Klassen et al. ............. | 382/167 |
| 6,108,098 A | * | 8/2000 | Owada et al. .............. | 358/1.14 |
| 6,351,320 B1 | * | 2/2002 | Shin .......................... | 358/1.9 |
| 6,384,935 B1 | * | 5/2002 | Yamazaki .................. | 358/1.9 |
| 6,476,924 B1 | * | 11/2002 | Toda et al. ................. | 358/1.13 |
| 6,519,052 B1 | * | 2/2003 | Oneda et al. .............. | 358/1.16 |
| 6,608,927 B2 | * | 8/2003 | Ohta .......................... | 382/167 |
| 2001/0048530 A1 | * | 12/2001 | Hayashi et al. ........... | 358/1.13 |

FOREIGN PATENT DOCUMENTS

| | | |
|---|---|---|
| JP | 6-9372 | 2/1994 |
| JP | 8-18807 | 1/1996 |
| JP | 2648455 | 5/1997 |

OTHER PUBLICATIONS

"ADBOE Magazine Summer 1998" ("Technology Spotlight"), pp. 35–37.
Yamauchi et al.; "Image Processing in Compressed Data Domain"; PC5J91; 2–4; Oct. 1991; pp. 37–40.

* cited by examiner

*Primary Examiner*—Mark Wallerson
*Assistant Examiner*—Michael Burleson
(74) *Attorney, Agent, or Firm*—Foley & Lardner LLP

(57) ABSTRACT

When a first mode is designated, an RGB image signal obtained by reading an image is compressed, decoded and stored. After that, the resultant signal is converted into a CMYK image signal on the basis of a first color conversion system, and an image based on the YMCK image signal is formed on a medium. When a second mode different from the first mode is designated, an RGB image signal obtained by reading an image is directly converted into a CMYK image signal on the basis of a second color conversion system, and an image based on the YMCK image signal is formed on a medium.

17 Claims, 18 Drawing Sheets

| (a) CMY BEFORE BLACKING ||| (b) C'M'Y'K AFTER BLACKING ||||
|---|---|---|---|---|---|---|
| C | M | Y | C' | M' | Y' | K |
| 100 | 95 | 90 | 10 | 5 | 0 | 90 |
| 95 | 100 | 95 | 0 | 5 | 0 | 95 |
| 95 | 95 | 95 | 0 | 0 | 0 | 95 |
| 95 | 100 | 90 | 5 | 10 | 0 | 90 |
| 100 | 95 | 85 | 15 | 10 | 0 | 85 |
| 95 | 100 | 80 | 15 | 20 | 0 | 80 |
| 90 | 95 | 90 | 0 | 5 | 0 | 90 |

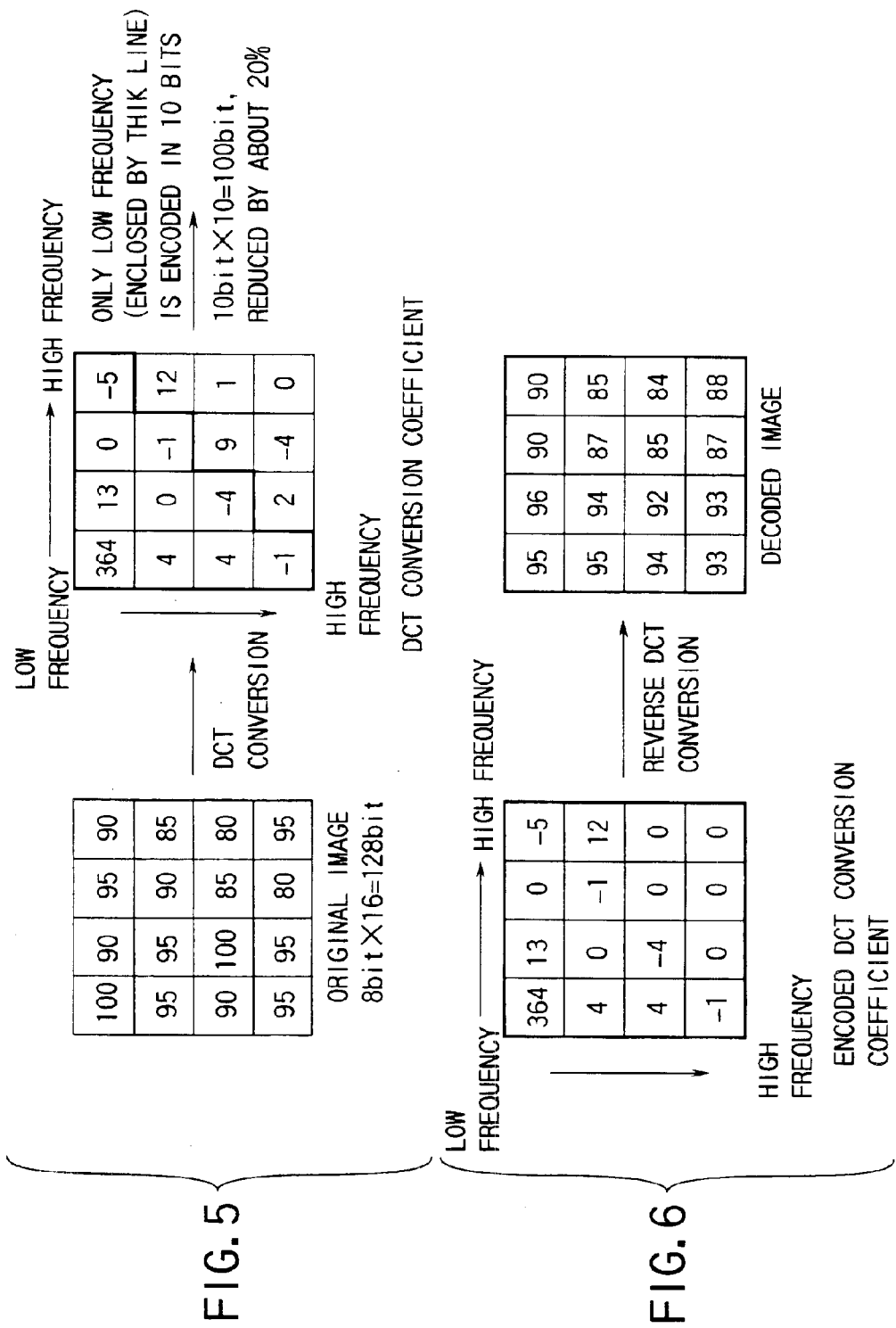

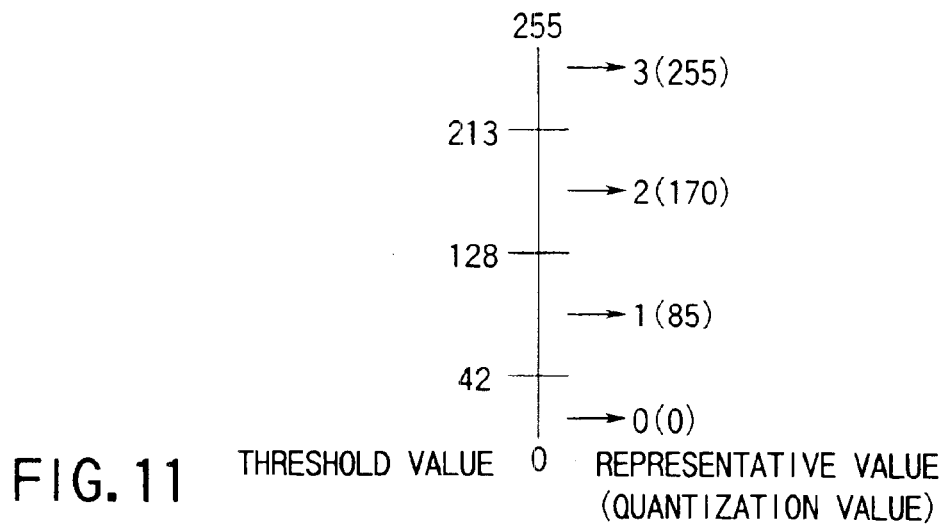
FIG. 11  THRESHOLD VALUE   REPRESENTATIVE VALUE
(QUANTIZATION VALUE)
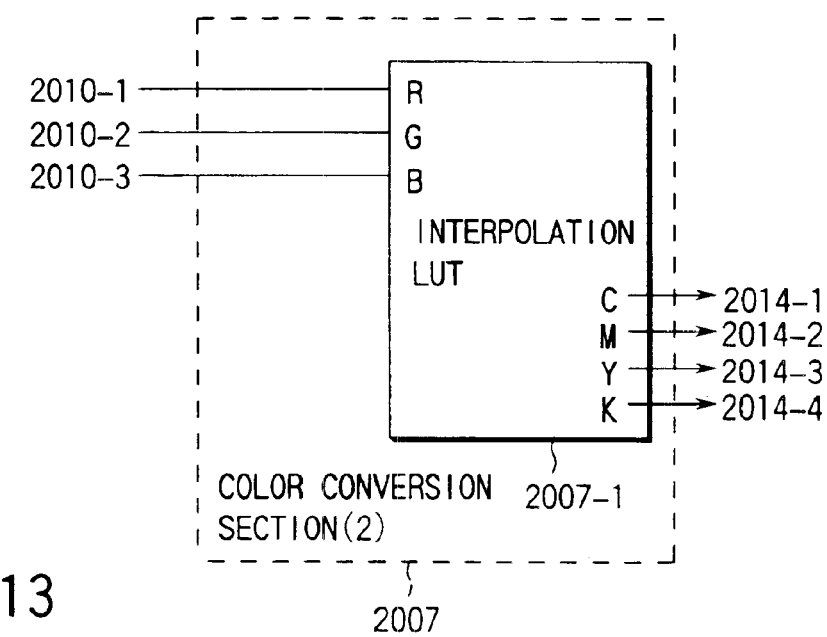
FIG. 12  RGB→CMYK CONVERSION LUT
FIG. 13

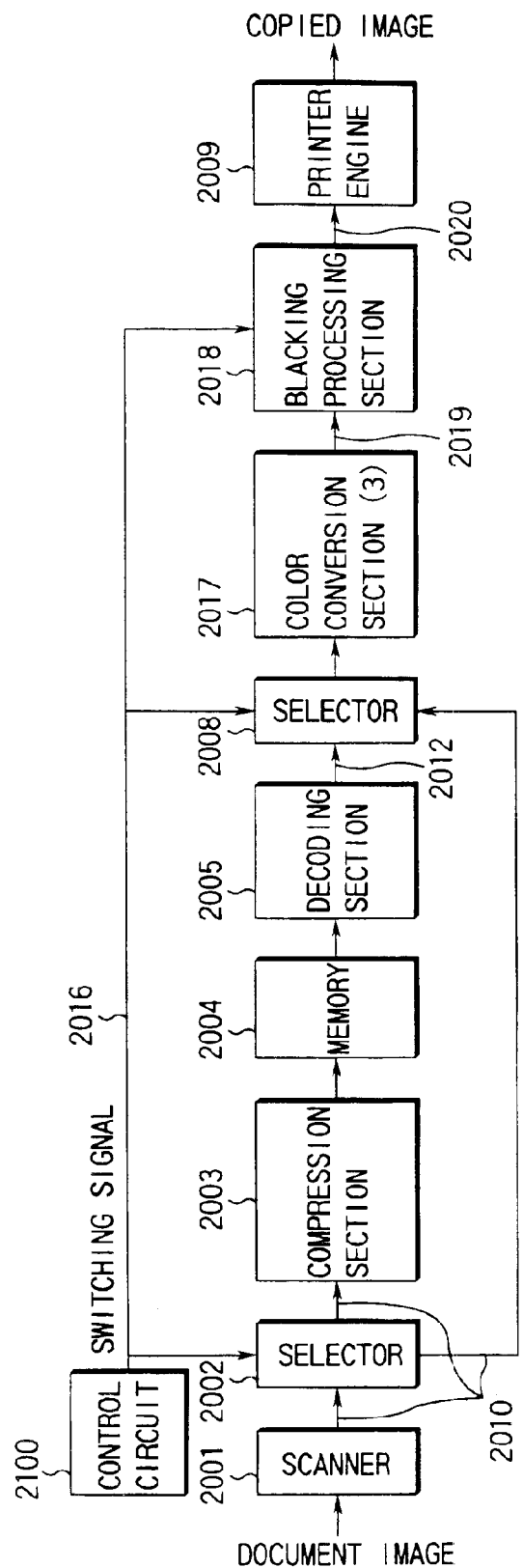

COLOR IMAGE PROCESSING APPARATUS THAT PERFORMS COLOR CONVERSION PROCESSING

CROSS-REFERENCE TO RELATED APPLICATION

This application is based upon and claims the benefit of priority from the prior Japanese Patent Application No. 11-077954, filed Mar. 23, 1999, the entire contents of which are incorporated herein by reference.

BACKGROUND OF THE INVENTION

Color copy machines, for example, are known as devices for reading a color document image and printing the read color image on, for example, a sheet of paper. These machines create and print a color image using a combination of CMYK signal components. Since each machine reads an original document image using an optical image reading device such as a scanner incorporated therein, an RGB signal corresponding to the read original document image is input to it. In other words, by the time the read document image is printed, an RGB signal (i.e. a three-color signal) is converted into a CMYK signal (i.e. a four-color signal). Conversion of this type includes, for example, a system for directly converting an RGB signal into a CMYK signal, or a system for converting an RGB signal into a CMY signal and then blacking processing (i.e. processing for adding a black (K) signal component to a CMY signal) to thereby obtain a CMYK signal.

When the image reading condition is 600 dpi/A4 (8 bits), the size of data on a read image is as large as 100 Mb in the case of RGB image data, and 133 Mb in the case of CMYK image data. Therefore, it is necessary to reduce memory load by data compression. If non-reversible data compression is executed, image quality will differ between before and after the compression. In light of this, image quality must be suppressed when executing non-reversible data compression. The following publications disclose techniques developed to satisfy such a demand.

Publication 1: Japanese Patent Application KOKAI Publication No. 8-18807 (Inventor: Koji Yabe)

Publication 2: "IMAGE PROCESSING BY COMPRESSED INFORMATION PROCESSING" PCSJ91, 2–4, pp37–40, October 1991, written by Takahiro Yamauchi Publication 1 discloses a technique for executing smoothing processing before compression processing to thereby prevent image quality degradation due to noise in an input device such as a scanner from being emphasized by compression processing.

Publication 2 discloses a technique for expanding, contracting or filtering a code compressed by the DCT system as a frequency conversion system employed for compression processing.

The technique disclosed in publication 1 can reduce the degree of image degradation due to compression processing. However, it cannot reduce the degree of image degradation caused by quantization executed when converting a three-color signal into a four-color signal using UCR (Under Color Reduction) processing as blacking processing executed after compression. Further, in this technique, the UCR processing et seq. is always performed on compressed image data. This means that no consideration is given to a case where both compressed image data and non-compressed image data are processed. Moreover, the publication does not disclose conversion of from three color signals to four color signals corresponding to the properties of images such as an image of a letter, an image of a picture, etc.

The technique disclosed in publication 2 describes, for example, filtering processing of compressed image data, but does not disclose, for example, consistency between compression processing and any other image processing.

BRIEF SUMMARY OF THE INVENTION

As described above, the prior art cannot reduce the degree of image degradation caused by quantization executed when converting three color signals into four color signals using UCR processing as blacking processing executed after compression. Furthermore, although the prior art discloses the UCR processing et seq. always performed on compressed image data, it neither considers a case where both compressed image data and non-compressed image data are processed, nor discloses conversion of from three color signals to four color signals corresponding to the properties of images such as an image of a letter, an image of a picture, etc. In addition, the prior art discloses filtering processing of compressed image data, but not consistency between compression processing and any other image processing.

In light of the above, it is an object of the invention to provide (1) an image processing apparatus capable of reducing the degree of degradation of image quality due to compression processing and blacking processing.

It is another object of the invention to provide (2) an image processing apparatus capable of executing compression, at a high compression ratio, of an image having many achromatic color portions, in light of both non-compressed image data and compressed image data, and further capable of minimizing the difference in quality between non-compressed image data and compressed image data when executing signal conversion, thereby creating a high quality image.

(1) An image processing apparatus according to the invention comprises: color conversion means for converting a first color image signal that does not contain a black color component, into a second color image signal that does not contain a black component; blacking processing means for adding a black component to the second color image signal to thereby create a third color image signal; and compression means for compressing the third color image signal on the basis of a frequency conversion system.

(2) An image processing apparatus according to the invention discriminates image processing to be executed on a color image signal that is compressed and then decoded, from image processing to be executed on a color/image signal that has never been compressed.

(3) An image processing apparatus according to the invention recognizes the type of an image on the basis of predetermined image data, and changes image processing to be executed on image data, on the basis of the recognized type.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently

FIG. 5 is a view useful in explaining compression executed by DCT conversion in the image processing apparatus of the first embodiment;

FIG. 6 is a view useful in explaining decoding executed by reverse DCT conversion in the image processing apparatus of the first embodiment;

FIG. 11 is a view showing the relationship between the threshold values of four-value error dispersion and quantization values;

FIG. 12 is a view showing an example of a LUT used for color conversion processing in the image processing apparatus of the second embodiment;

FIG. 13 is a schematic view illustrating a color conversion section (2) in the image processing apparatus of the second embodiment;

FIG. 16 is a schematic block diagram illustrating a digital color copy machine to which an image processing apparatus according to a modification of the second embodiment of the invention is applied;

FIG. 17 is a view useful in explaining color conversion executed in the modification of the image processing apparatus of the second embodiment;

DETAILED DESCRIPTION OF THE INVENTION

The embodiments of the invention will be described with reference to the accompanying drawings.

Figure 1:
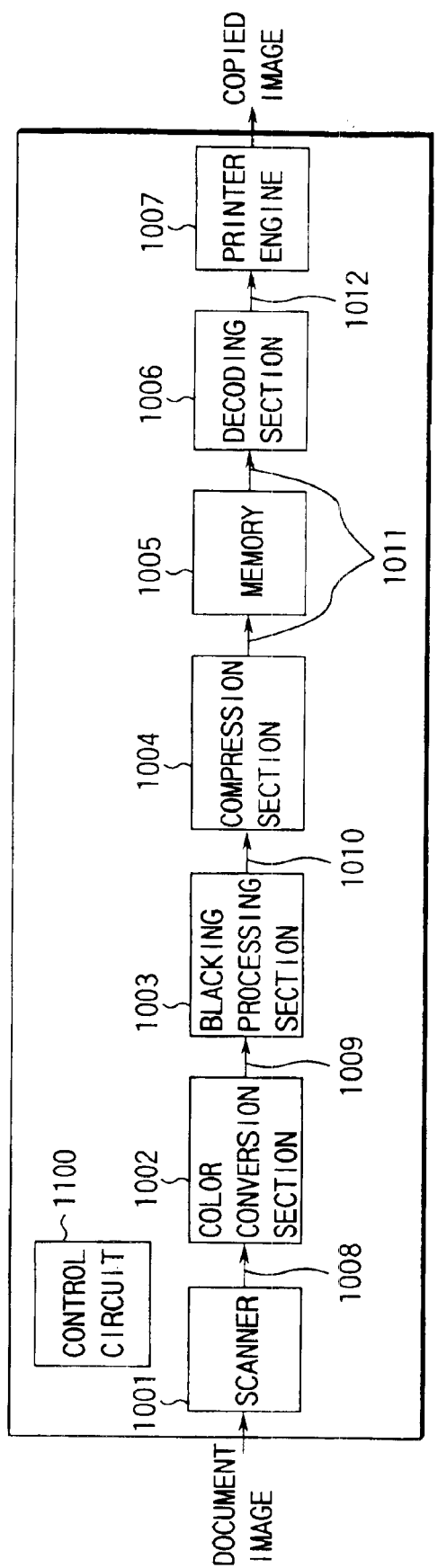
FIG. 1 is a schematic block diagram illustrating a digital color copy machine to which an image processing apparatus according to a first embodiment of the invention is applied.

FIG. 1 shows the entire structure of a digital color copy machine to which an image processing apparatus according to a first embodiment of the invention. This digital color copy machine comprises a scanner 1001, a color conversion section 1002, a blacking processing section 1003, a compression section 1004, a memory 1005, a decoding section 1006, a printer engine 1007 and a control circuit 1100.

The basic operation of the digital color copy machine will be described. The scanner 1001 reads an image of a document to be copied, creates input image data corresponding to the read document image, and supplies it as a RGB signal to the color conversion section 1002. The color conversion section 1002 converts the RGB signal supplied from the scanner section 1001, into a CMY signal (an ink signal), and supplies it to the blacking processing section 1003. The blacking processing section 1003 converts the CMY signal from the color conversion section 1002, into a C'M'Y'K' signal, and supplies it to the compression section 1004. The compression section 1004 compresses the C'M'Y'K' signal supplied from the blacking processing section 1003 to thereby obtain a compressed-data signal 1011, and supplies the signal 1011 to the memory 1005. The memory 1005 stores the compressed-data signal 1011. The decoding section 1006 reads the compressed-data signal 1011 from the memory 1005 at any time, and decodes it into a decoded signal 1012, and supplies the signal 1012 to the printer engine 1007. The printer engine 1007 forms an image on a predetermined medium (such as a sheet of paper) on the basis of the encoded signal 1012 encoded by the encoding section 1006. The control circuit 1100 controls the entire copy operation. A copy of the document image is obtained from the above-described basic operation.

Figure 2:
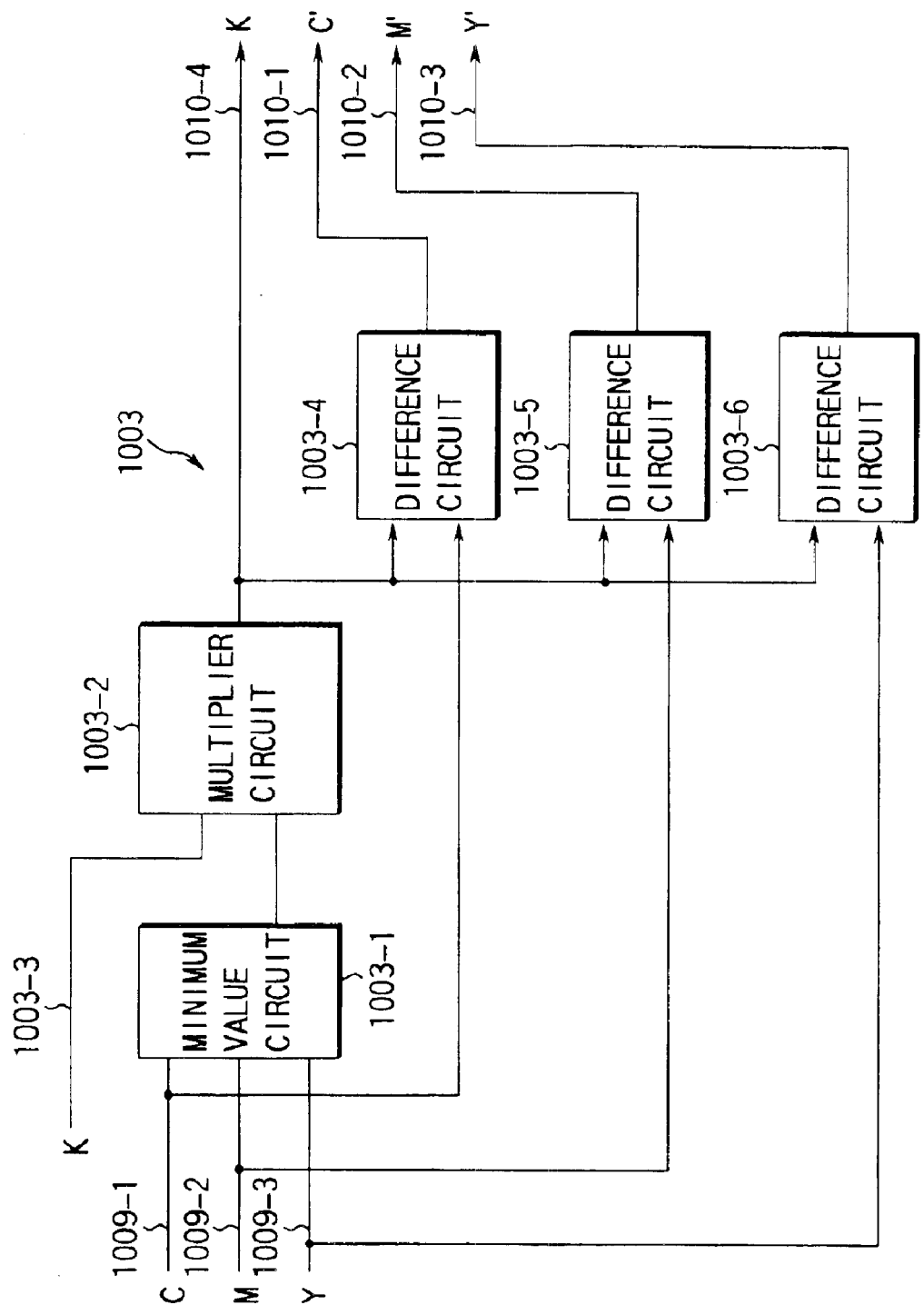
FIG. 2 is a schematic block diagram illustrating a blacking processing section incorporated in the image processing apparatus of the first embodiment.

Referring now to the block diagram of FIG. 2, the operation of the blacking processing section 1003 will be described. The blacking processing section 1003 includes a minimum-value circuit 1003-1, a multiplier circuit 1003-2, and difference units 1003-4, 1003-5 and 1003-6.

The blacking processing section executes processing expressed by the following formula (in the case of UCR) to obtain a C'M'Y'K' signal from a CMY signal.

| | |
|---|---|
| K = k × min (C, M, Y) | (min: the minimum value of C, M, Y values) |
| | (k: black ratio; 100% → 1, 0% → 0) |
| C' = C − K | |
| M' = M − K | |
| Y' = Y − K | |

The operation of the blacking processing section executed when the black ratio is 100% will be described. The minimum-value circuit 1003-1 obtains a minimum value component from the CMY signal. The multiplier circuit 1003-2 multiplies the minimum value component by a black ratio k1003-3 to thereby create a K signal component 1010-4. The difference units 1003-4, 1003-5 and 1003-6 create C'M'Y' signal components 1010-1, 1010-2 and 1010-3, respectively.

Figures 3, 4:
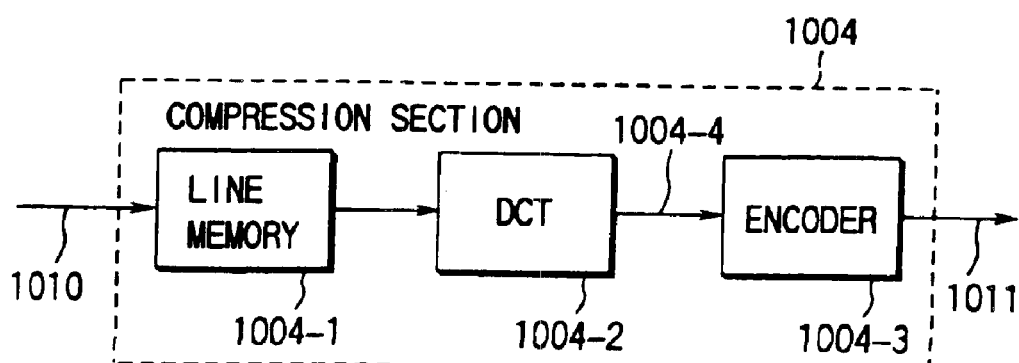
FIG. 3 is a view illustrating CMY values obtained before blacking processing in a blacking processing section incorporated in the image processing apparatus of the first embodiment, and also illustrating C'M'Y'K' values obtained after the blacking process.
FIG. 4 is a schematic block diagram showing a compression section incorporated in the image processing apparatus of the first embodiment.

FIG. 3 shows conversion results in terms of specific numerical values. In the case of (a) of FIG. 3 showing signal levels before blacking processing, the difference in signal level between adjacent pixels of C or M due to, for example, noise is only 5. However, in the case of (b) of FIG. 3 showing signal levels after blacking processing, the difference in signal level between adjacent pixels of C' or M' is 15 at maximum.

Referring then to the block diagram of FIG. 4, the compression section 1004 will be described. The compression section includes a line memory 1004-1, a DCT 1004-2 and an encoder 1004-3.

The line memory 1004-1 keeps the levels of a CMYK signal supplied in units of one raster so that the DCT 1004-2 can deal with the signal in units of one block consisting of (4×4) pixels. The DCT 1004-2 executes DCT calculation expressed by the following formula in units; of (4×4) pixels.

$$x[u, v] = \left(\frac{2}{N}\right) c[u] \, c[v] \sum_{m=0}^{N-1} \sum_{n=0}^{N-1} x[m, n] \times \cos\frac{(2m+1)u\pi}{2N} \cos\frac{(2n+1)v\pi}{2N} \, c[k] =$$

$$\begin{cases} \frac{1}{\sqrt{2}}, & k = 0 \\ 1, & k \neq 0 \end{cases}$$

where N represents the number (=4) of blocks, x[m, n] each pixel value, and X[u, v] a DCT coefficient.

DCT calculation results 1004-4 (1004-4-1 corresponds to C, 1004-4-2 to M, 1004-4-3 to Y and 1004-4-4 to K) are encoded by the encoder 1004-3, output as compressed-data signal components 1011 and stored in the memory 1005.

When in general, an image signal is subjected to frequency conversion, spectra of colors more concentrate on a low frequency component side of the image signal than on a high frequency component side. Accordingly, non-reversible compression can be executed at a high compression ratio by encoding only low frequency components.

FIG. 5 shows examples of sixteen (=4×4) DCT calculation results for each CMYK signal component. As is understood from FIG. 5, the amount of code data can be reduced by about 20% by simply excluding six frequency components of high frequencies using the encoder 1004-3, after subjecting an 8-bit image signal to DCT conversion, and expressing each of the other frequency components (enclosed by the thick line) in terms of 10 bits. Since encoding of low frequency components using frequency conversion as in this embodiment is a well known method, no detailed description will be given thereof. The same processing is executed on each of the CMYK signal components.

The operation of the decoding section 1006 will be described with reference to FIG. 6.

In this section, each compressed-data signal 1011 is read from the memory 1005 and decoded into an image signal using reverse DCT calculation expressed by the following formula:

$$x[m, n] =$$

$$\left(\frac{2}{N}\right) \sum_{u=0}^{N-1} \sum_{v=0}^{N-1} c[u] \, c[v] \, X[u, v] \times \cos\frac{(2m+1)u\pi}{2N} \cos\frac{(2n+1)v\pi}{2N} \, c[k] =$$

$$\begin{cases} \frac{1}{\sqrt{2}}, & k = 0 \\ 1, & k \neq 0 \end{cases}$$

where N represents the number (=4) of blocks, x[m, n] each encoded pixel value, and X[u, v] a DCT coefficient.

The encoded image shown in (b) of FIG. 6 has smaller variations in pixel value than in the original image shown in FIG. 5. This results from a combination of compression processing and low-pass processing executed so as to exclude high frequency components as in usual data compression using frequency conversion. Further, in compression executed using frequency conversion after blacking processing as in the present invention, a certain color component such as Y' has small variations in pixel value as shown in FIG. 3, and the pixel values of the components other than K approach 0 in the vicinity of achromatic color. This means that the use of frequency conversion for data compression after blacking processing enhances the compression efficiency.

Figure 7:
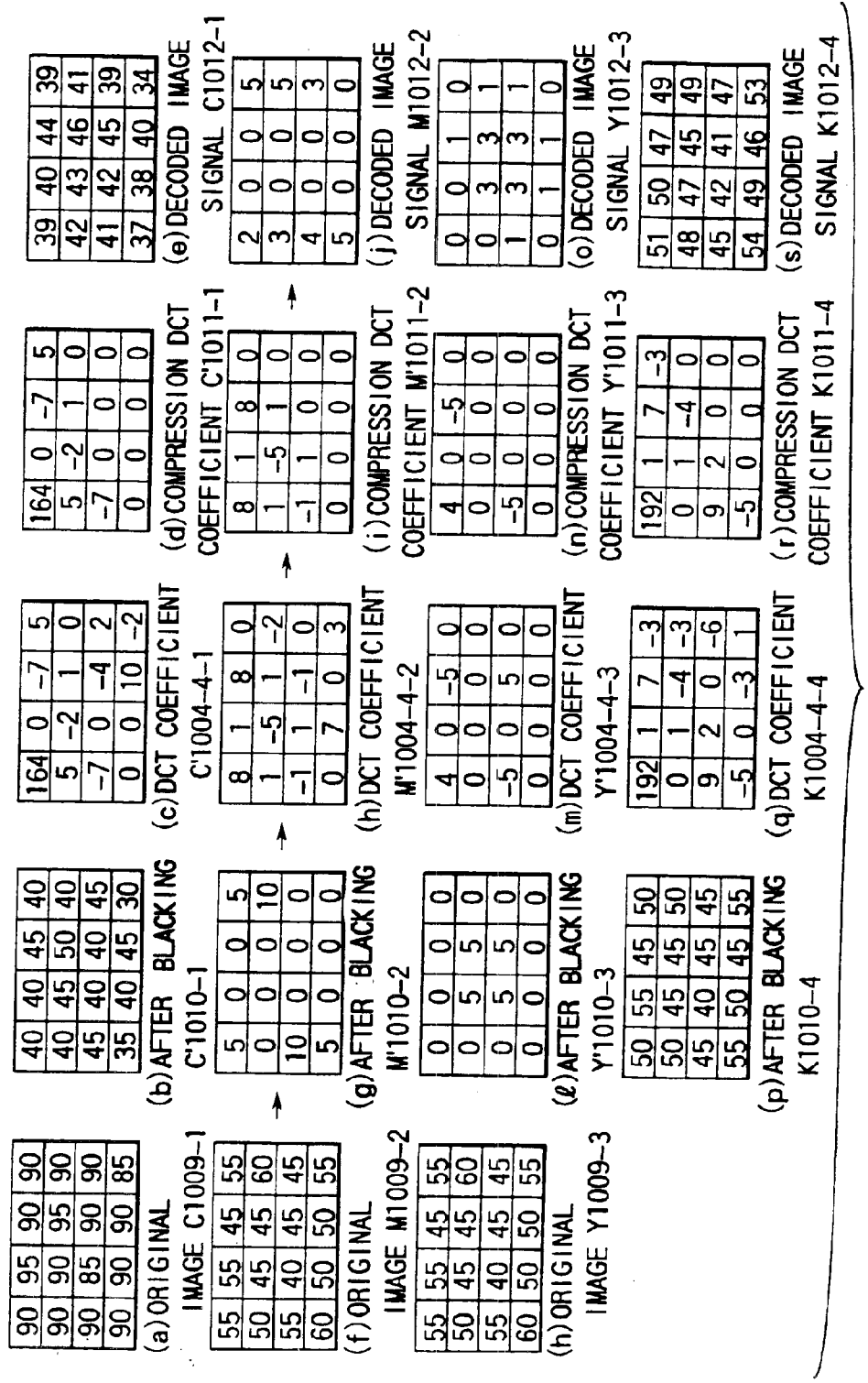
FIG. 7 is a view useful in explaining processing ranging from blacking processing to compression/decoding in the image processing apparatus of the first embodiment.

FIG. 7 shows examples of signal components obtained by subjecting (4×4) CMY signal components to blacking, compression and decoding processing. In this embodiment, the encoder performs fixed length encoding. However, in the case of signal components such as Y' signal components, many of which have a value of 0, or signal components such as Y' or M' signal components, which have low values, the compression ratio can be further increased if variable length encoding is executed.

As described above, in the first embodiment in which compression is executed after blacking processing, noise due to blacking processing can be suppressed by the low-pass effect, and further, the compression efficiency can be enhanced by virtue of the feature of the blacking processing.

Although the embodiment employs UCR as blacking processing, another type of blacking processing such as GCR (Gray Component Removal) can be used instead of UCR.

In the case of GCR blacking processing, C'M'Y'K' signal components are created from CMY signal components by processing expressed by the following formula:

| | |
|---|---|
| K = k × min (C, M, Y) | (min: the minimum value of C, M, Y values) |
| | (k: black ratio; 100% → 1, 0% → 0) |
| C' = (C − K)/(1 − K) | |
| M' = (M − K)/(1 − K) | |
| Y' = (Y − K)/(1 − K) | |

A second embodiment will now be described.

Figure 8:
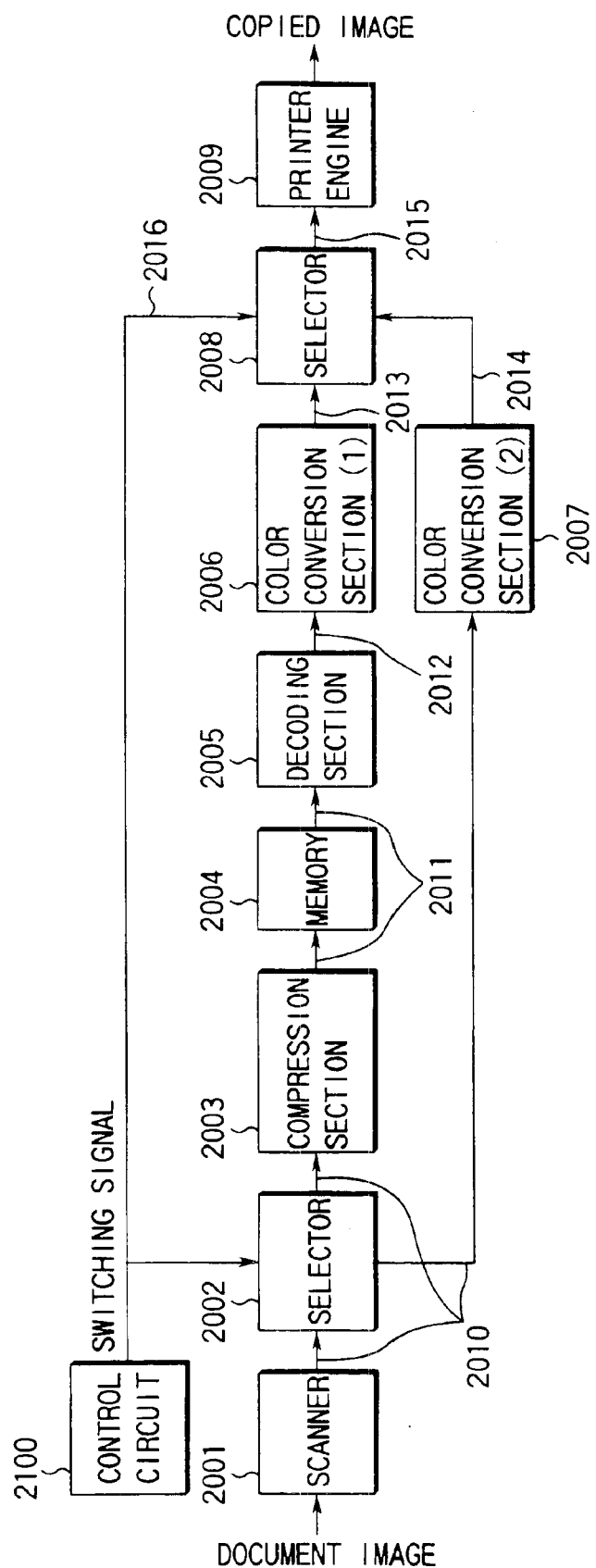
FIG. 8 is a schematic block diagram illustrating a digital color copy machine to which an image processing apparatus according to a second embodiment of the invention is applied.

FIG. 8 shows the entire structure of a digital color copy machine to which an image processing apparatus according to a second embodiment of the invention.

This digital color copy machine comprises a scanner 2001, a selector 2002, a compression section 2003, a memory 2004, a decoding section 2005, a color conversion section (1) 2006, a color conversion section (2) 2007, a selector 2008, a printer engine 2009 and a control circuit 2100.

The basic operation of the digital color copy machine will be described. The control circuit 2100 controls the entire copying operation.

During usual copying operation, the control circuit 2100 outputs a first switching signal 2016 to the selectors 2002 and 2008. Upon receiving the first switching signal 2016, the selector 2002 supplies the color conversion section (2) 2007 with an image signal output from the scanner 2001, and the selector 2008 supplies the printer engine 2009 with an image signal output from the color conversion section (2) 2007. The scanner 2001 reads an image of a document to be copied and creates, as an RGB signal, input image data corresponding to the read document image. In other words, at the time of usual copying, an RGB signal output from the scanner 2001 is directly subjected to color conversion and printed.

Figure 9:
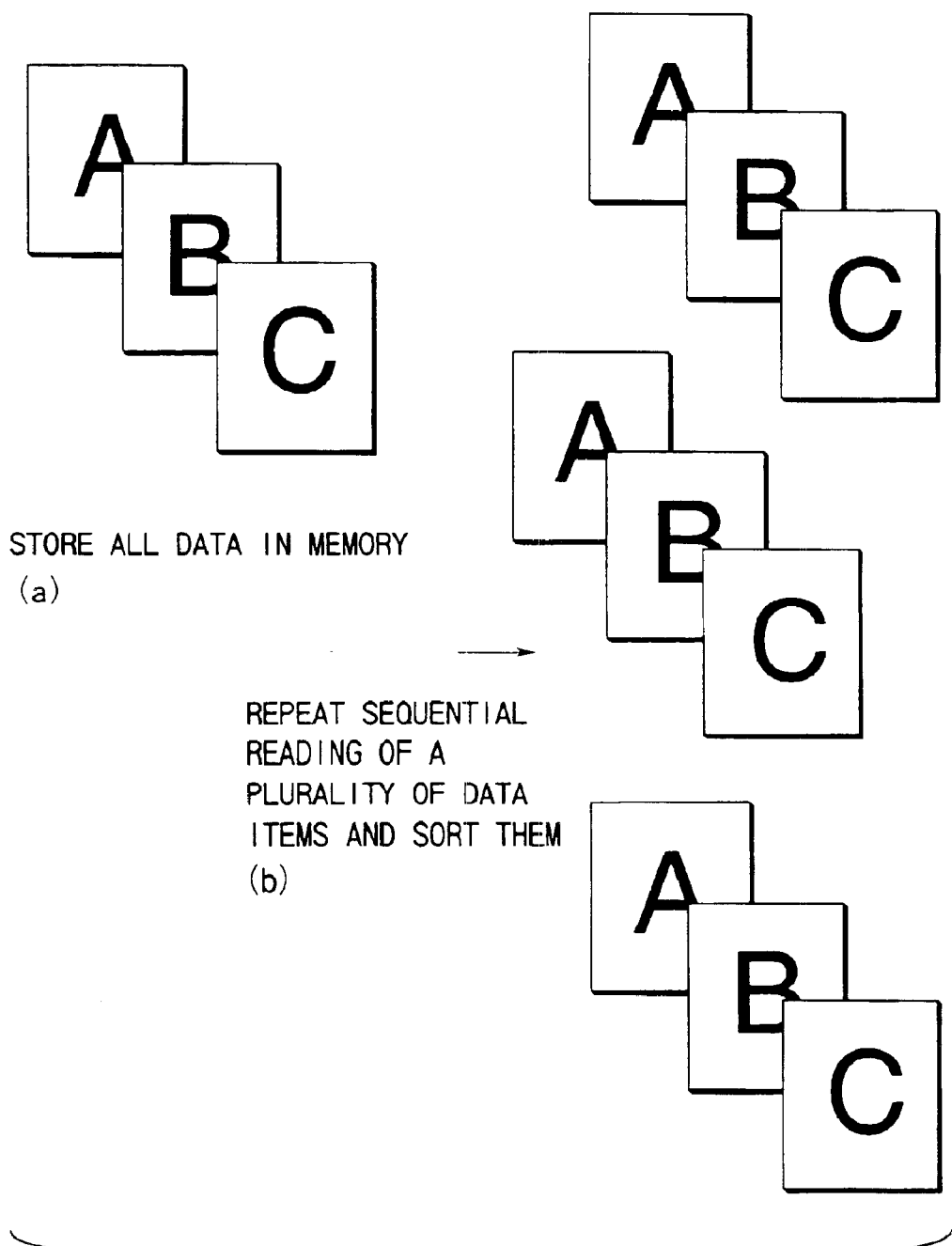
FIG. 9 is a view useful in explaining the electronic sorting operation of the image processing apparatus according to the second embodiment.

On the other hand, when executing a copying operation using a function called "electronic sorting" as shown in FIG. 9, the control circuit 2100 outputs a second switching signal 2016 to the selectors 2002 and 2008. Upon receiving the second switching signal 2016, the selector 2002 supplies the compression section 2003 with an image signal output from the scanner 2001, and the selector 2008 supplies the printer engine 2009 with an image signal output from the color conversion section (1) 2006. In other words, at the time of copying using the electronic sorting function, an RGB signal output from the scanner 2001 is color-converted and printed after it is compressed, stored and decoded.

The compression section 2003 subjects an RGB signal supplied from the selector 2002, to non-reversible compression processing, thereby creating compressed data and then storing the data in the memory 2004. When necessary, the compressed data stored in the memory 2004 is read and sent to the decoding section 2006. The decoding section 2006 decodes the compressed data read from the memory 2004, into an RGB signal, and supplies it to the color conversion section (1) 2006. The color conversion section (1) 2006 converts the RGB signal from the decoding section, into a CMYK signal and supplies it to the selector 2008. On the other hand, the color conversion section (2) 2007 converts an RGB signal from the selector 2002, into a CMYK signal, and supplies it to the selector 2008. The printer engine 2009 forms an image on a predetermined medium (such as a sheet of paper) on the basis of the CMYK signal supplied thereto via the selector 2008. The above-described basic operations enable copying of a document image.

Figure 10:
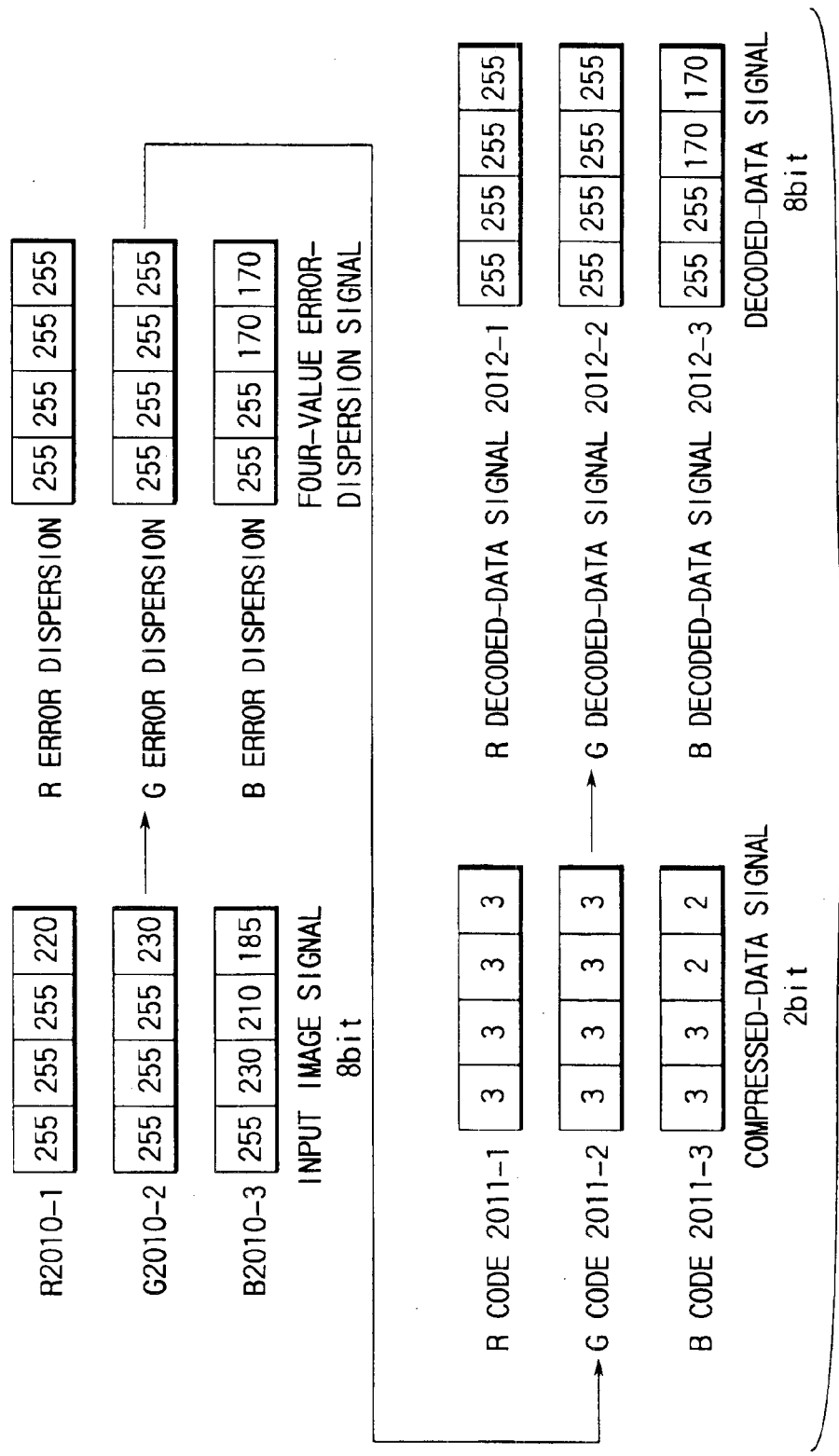
FIG. 10 is a view useful in explaining compression executed in the image processing apparatus of the second embodiment, using one-dimensional four-value error dispersion.

Referring then to FIGS. 10 and 11, the operations of the compression section 2003 and the decoding section 2005 will be described. As shown in FIG. 10, the compression section 2003 executes well-known one-dimensional four-value error dispersion processing, using threshold values and quantization values shown in FIG. 11. As is understood from FIG. 10, 8-bit data of each R, G or B signal component (24 bits in total) is compressed by 75% into a corresponding 2-bit representative value (6 bits in total). Thus, the resultant data amount is 25% of the original data amount. The resultant compressed data 2011 is stored in the memory 2004 and decoded by the decoding section 2005.

The color conversion section (1) 2006 and the color conversion section (2) 2007 will now be described. Color conversion is processing for converting three RGB signal components into four CMYK signal components used for printing by the printer engine 2009. FIG. 12 is an example of a color conversion table. If a look up table (LUT) stores all values of three 8-bit RGB signal components, it must store data of as much as 256×256×256 (input RGB signal components)×4×8 bits (output CMYK signal components)= 64 Mbytes. To reduce the amount of to-be-stored data, data obtained by thinning data at regular intervals is stored in the table instead of storing all values of the RGB signal components, and the known interpolation is executed. In this embodiment, every fifteenth value is stored, and hence the required capacity of the LUT is only 23 Kbits.

However, if non-compressed data and compressed data are color-converted by the same system, a great conversion error will occur therebetween even in a unit of several pixels. To avoid this, the color conversion section (2) 2007 and the color conversion section (1) 2006 incorporate the same interpolation LUT as shown in FIGS. 13 and 14.

Figure 14:
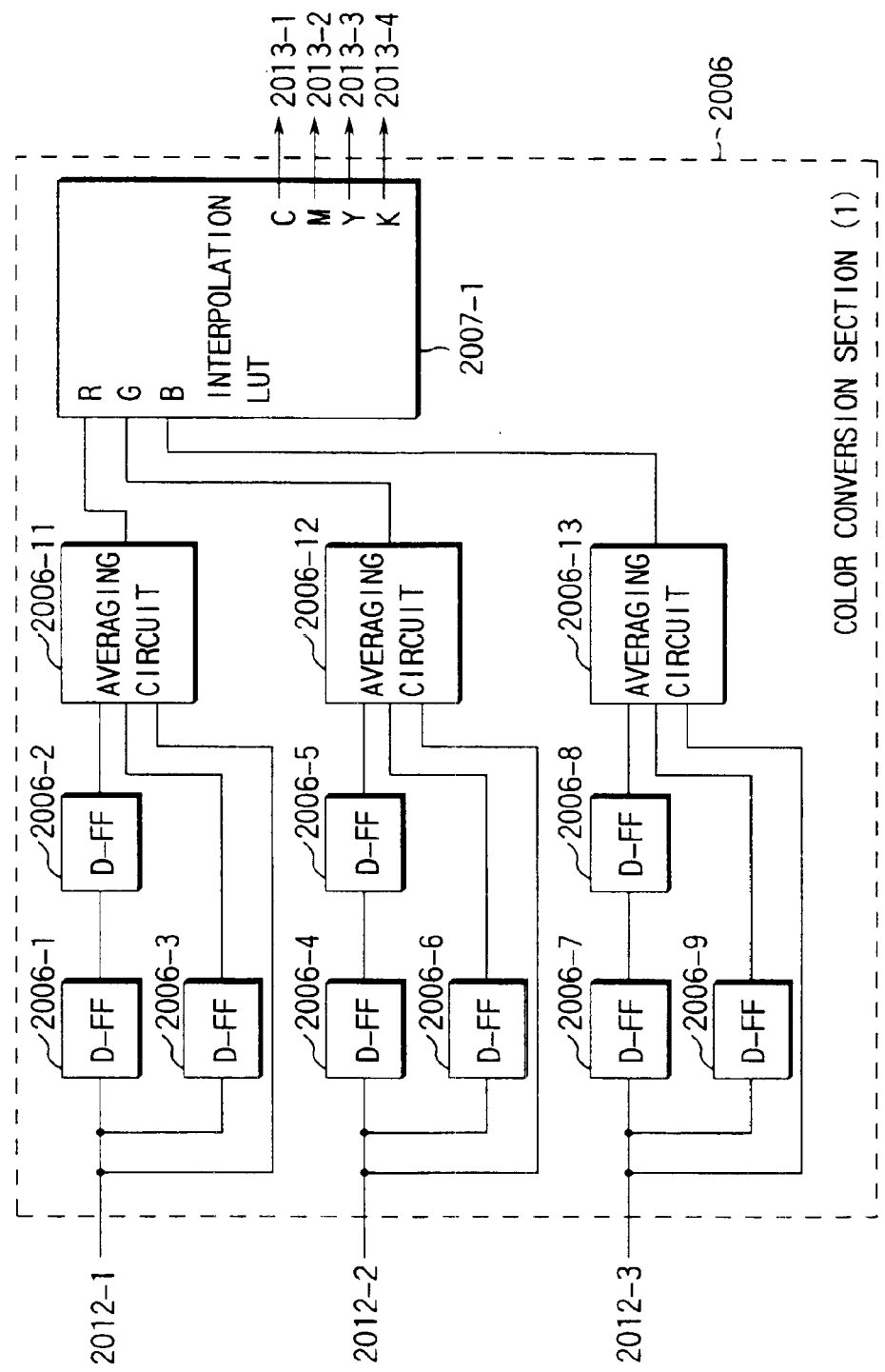
FIG. 14 is a schematic view illustrating a color conversion section (1) in the image processing apparatus of the second embodiment.

Specifically, as shown in FIG. 14, the color conversion section (1) 2006 includes D-FFs 2006-1–2006-9, averaging circuits 2006-11–2006-13, and an interpolation LUT 2007-1. In the color conversion section (1) 2006, the average value of several pixels is calculated before data is input to the interpolation LUT 2007-1, in order to minimize the conversion error between non-compressed data and compressed data.

Figure 15:
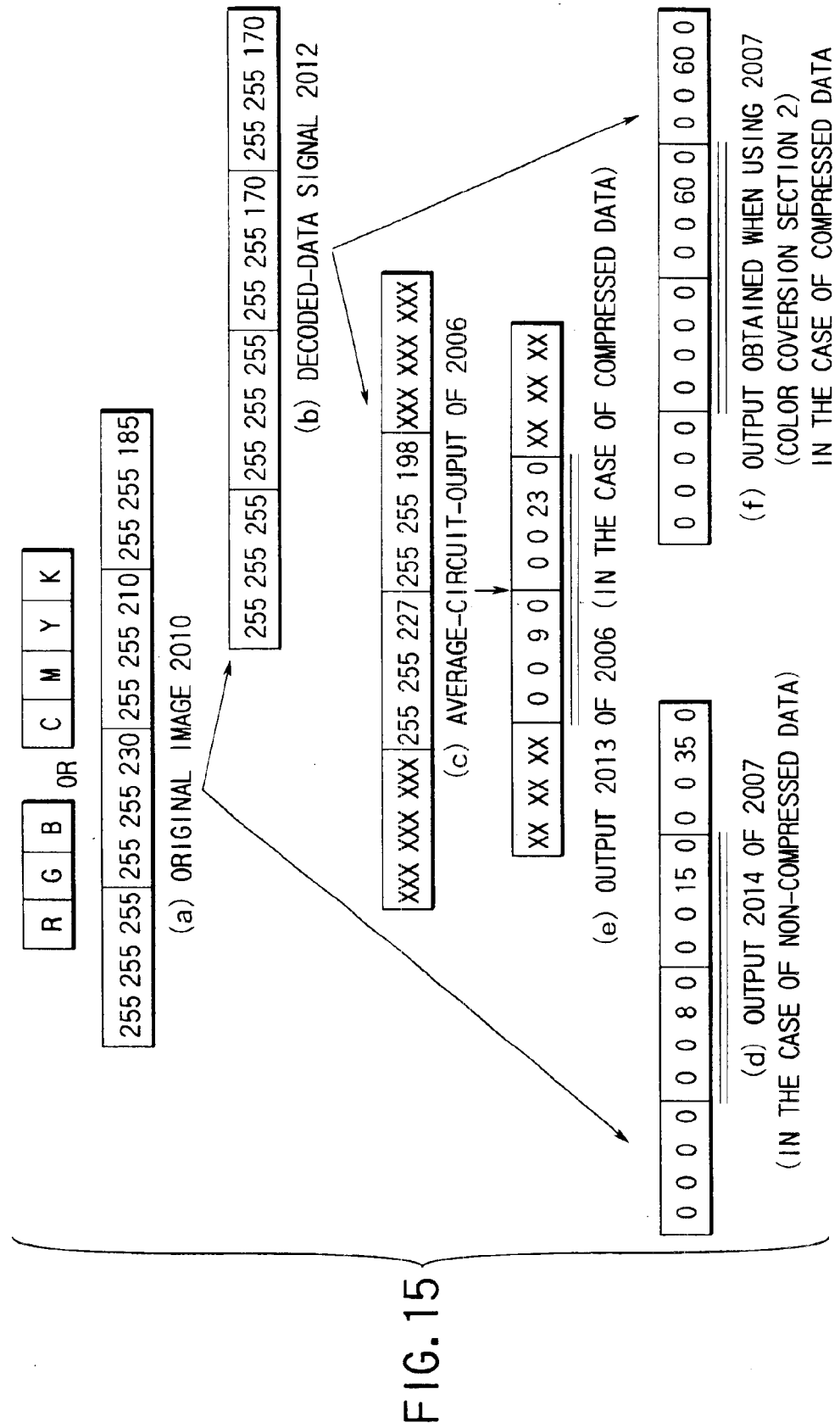
FIG. 15 is a view useful in explaining compression, decoding and color conversion executed in the image processing apparatus of the second embodiment.

FIG. 15 illustrates examples of conversion results.

(f) of FIG. 15 shows a compressed-data case where a decoded-data signal 2012 shown in (b) of FIG. 15, corresponding to a compressed image obtained by compressing an original image 2010 shown in (a) of FIG. 15, is converted by the color conversion section (2) 2007. Further, (c) and (e) of FIG. 15 show another compressed-data case where the decoded-data signal 2012 is converted by the color conversion section (1) 2006. (d) of FIG. 15 shows a non-compressed-data case where non-compressed data is converted by the color conversion section (2) 2007. These figures clarify that when converting compressed data, the color conversion section (1) 2006 provides a smaller conversion error than the color conversion section (2) 2007, and hence realizes a smaller difference in image quality between compressed and non-compressed images.

As described above, the second embodiment can realize a small difference in tint between image data that has been once compressed, and image data that has not yet been compressed, by changing color conversion methods therebetween. Although the second embodiment employs the same color conversion table between compressed data and non-compressed data, different color conversion tables may be used therebetween.

A modification of the second embodiment will be described.

FIG. 16 illustrates the entire structure of a digital color copy machine to which an image processing apparatus according to a modification of the second embodiment of the invention. The digital color copy machine of FIG. 16 only partially differs from that of FIG. 8. Therefore, similar elements to those in FIG. 8 are denoted by corresponding reference numerals, and no detailed description will be given thereof.

This digital color copy machine of FIG. 16 comprises a scanner 2001, a selector 2002, a compression section 2003, a memory 2004, a decoding section 2005, a selector 2008, a color conversion section (3) 2017, a color conversion section (2) 2007, a blacking processing section 2018, a printer engine 2009 and a control circuit 2100.

The basic operation of the digital color copy machine will be described. The control circuit 2100 controls the entire copying operation.

During usual copying operation, the control circuit 2100 outputs a first switching signal 2016 to the selectors 2002 and 2008 and the blacking processing section 2018. Upon receiving the first switching signal 2016, the selector 2002 supplies the selector 2008 with an image signal output from the scanner 2001, the selector 2008 supplies the printer engine 2009 with an image signal output from the color conversion section (3) 2017, and the blacking processing section 2018 selects a black ratio for non-compression and executes blacking processing. The scanner 2001 reads an image of a document to be copied and creates, as an RGB signal, input image data corresponding to the read document image. In other words, at the time of usual copying, an RGB signal output from the scanner 2001 is directly subjected to color conversion and printed.

When executing a copying operation using a function called "electronic sorting" as shown in FIG. 9, the control circuit 2100 outputs a second switching signal 2016 to the selectors 2002 and 2008. Upon receiving the second switching signal 2016, the selector 2002 supplies the compression section 2003 with an image signal output from the scanner 2001, the selector 2008 supplies the color conversion section (3) 2017 with an image signal output from the decoding section 2005, and the blacking processing section 2018 selects a black ratio for compression and executes blacking processing. In other words, at the time of copying using the electronic sorting function, an RGB signal output from the scanner 2001 is subjected to color conversion, then to blacking processing based on the black ratio for compression, and printed, after it is compressed, stored and decoded.

The color conversion section (3) 2017 and the blacking processing section 2018 will be described.

FIG. 17 shows a table installed in the color conversion section (3) 2017. This table is used to output a CMY signal corresponding to an input RGB signal. As in the second embodiment, this table stores only every fifteenth value obtained by subjecting input values to known interpolation processing.

Figure 18:
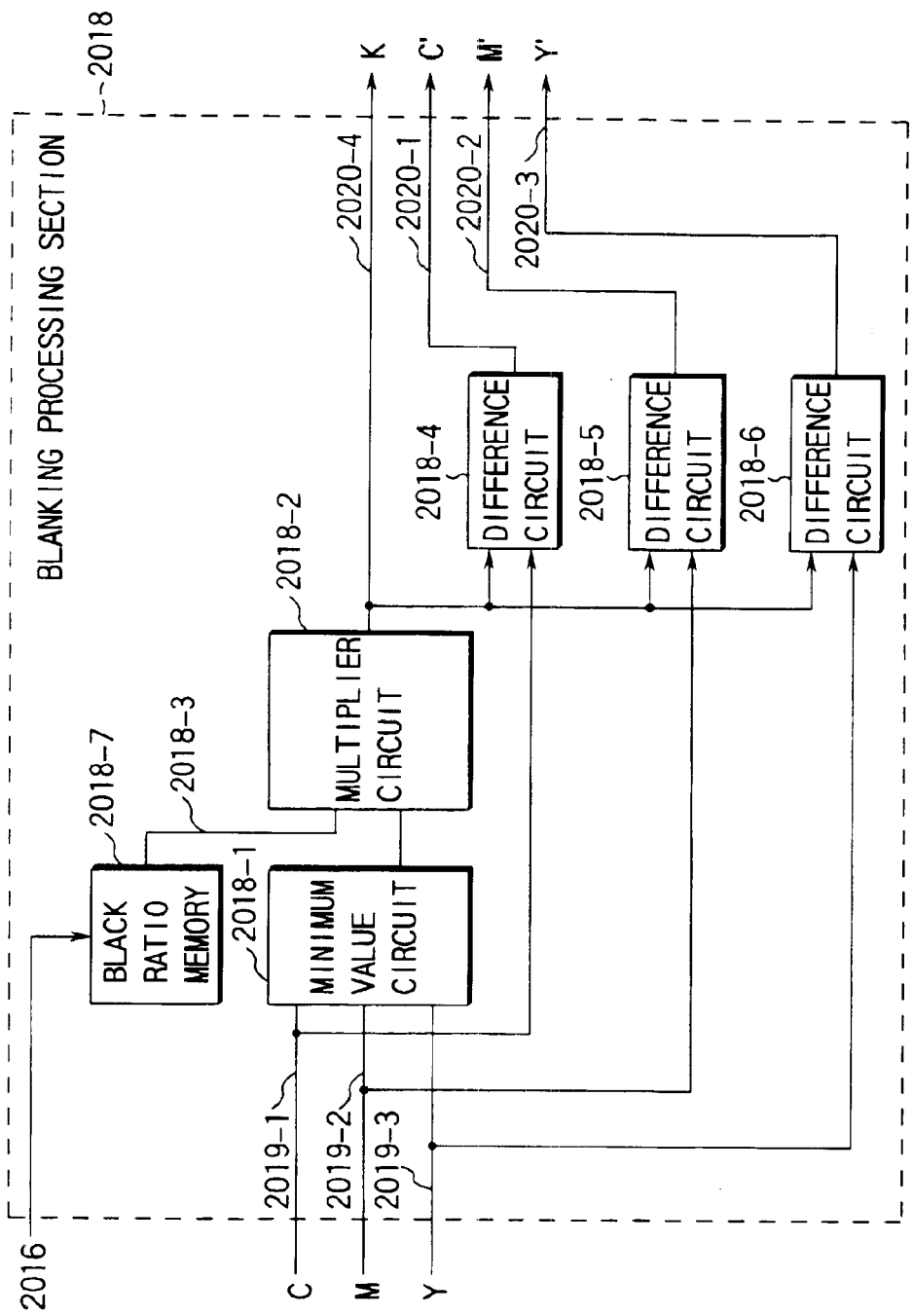
FIG. 18 is a schematic view showing a blacking processing section incorporated in the modification of the image processing apparatus of the second embodiment.

FIG. 18 shows an example of a structure of the blacking processing section 2018. The blacking processing section 2018 includes a minimum-value circuit 2018-1, a multiplier circuit 2018-2, difference units 2018-4–2018-6, and a black ratio memory 2018-7.

Upon receiving a first switching signal 2016 output from the control circuit 2100, the black ratio memory 2018-7 supplies the multiplier circuit 2018-2 with a black ratio k2018-3 for non compression. On the other hand, upon receiving a second switching signal 2016 output from the control circuit 2100, the black ratio memory 2018-7 supplies the multiplier circuit 2018-2 with a black ratio k2018-3 for compression. Thus, output of signals for non-compression and for compression is switched.

Figure 19:
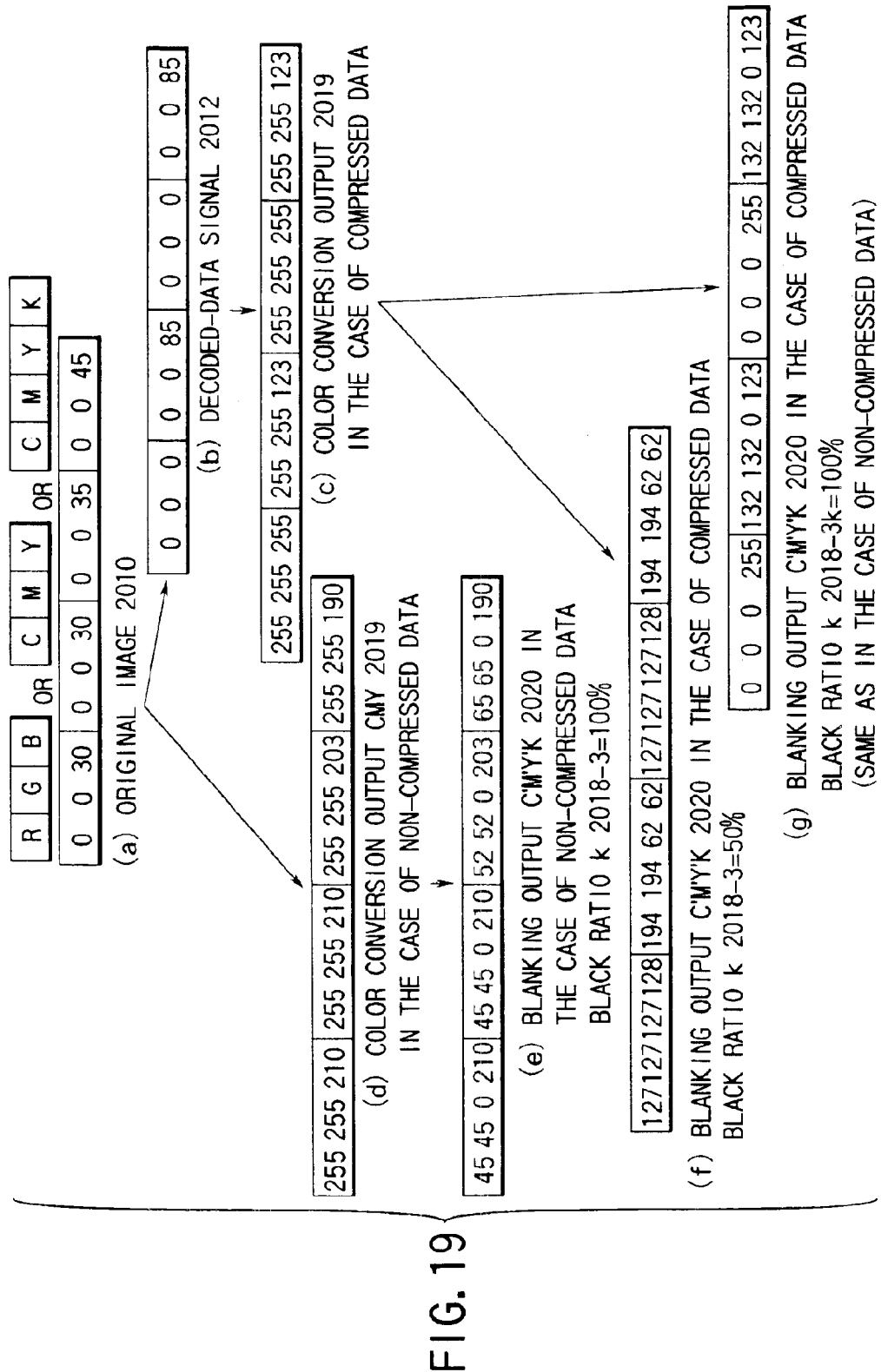
FIG. 19 is a view useful in explaining compression, decoding and color conversion executed in the modification of the image processing apparatus of the second embodiment.

FIG. 19 is a view useful in comparing color conversion and blacking processing executed on compressed and non-compressed images. It is understood from the figure that if compressed and non-compressed images are processed at the same black ratio, the levels of output signals greatly differ, whereas if a non-compressed image is processed at a black ratio of 100% and a compressed image is processed at a black ratio of 50%, variations in output signal level are minimized.

As described above, in the modification of the second embodiment, the range of variations in output signal level due to compression processing can be minimized by changing the black ratio used for blacking processing during compression and non-compression, thereby improving image quality.

Although in the embodiment, the black ratio is changed while the same blacking system is used, the image quality can be improved also by changing the blacking system itself. For example, suppose that the blacking processing section 2018 executes blacking processing using two types of blacking systems (UCR and GCR) to be switched on the basis of a control signal output from the control circuit 2100. In this case, the black processing section 2018 executes black processing using one of the blacking systems, upon receiving the first switching signal 2016, and executes black processing using the other blacking system, upon receiving the second switching signal 2016. Thus, blacking processing is executed on image data that has been compressed once, and on image data that has not yet been compressed, using different blacking systems.

A third embodiment will be described.

Figure 20:
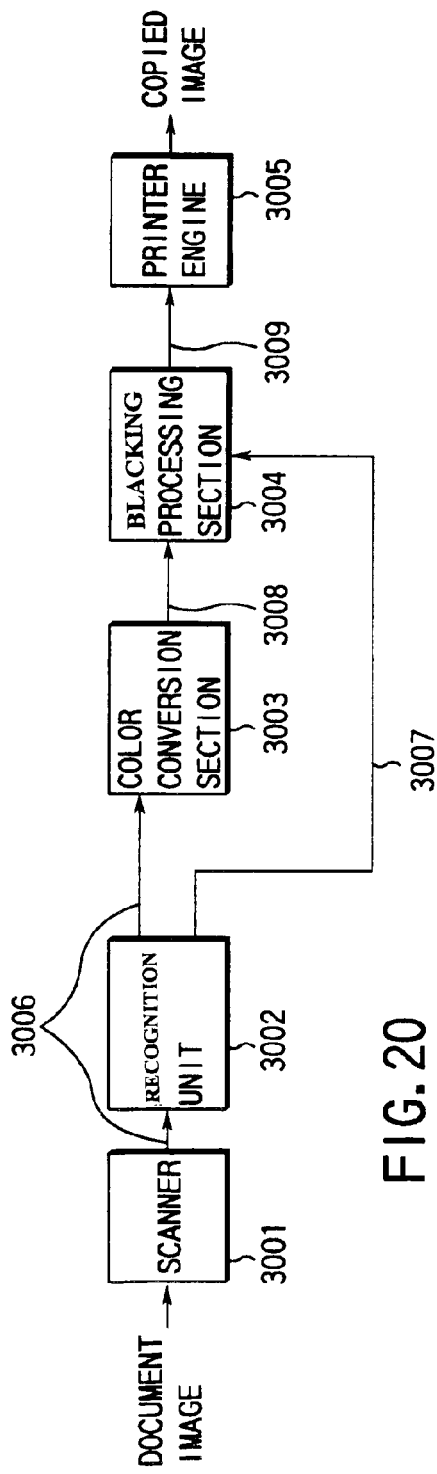
FIG. 20 is a schematic block diagram illustrating a digital color copy machine to which an image processing apparatus according to a third embodiment of the invention is applied.

FIG. 20 illustrates the entire structure of a digital color copy machine to which an image processing apparatus according to a third embodiment of the invention.

This digital color copy machine comprise a scanner 3001, a recognition unit 3002, a color conversion section 3003, a blacking processing section 3004, and a printer engine 3005. The basic operation of the digital color copy machine will be described. The scanner 3001 reads an image of a document to be copied, creates input image data corresponding to the read document image, and supplies an RGB signal 3006 indicating the read image to the recognition unit 3002. The recognition unit 3002 recognizes on the basis of the RGB signal 3006 whether or not the document image is a letter image or a photograph image. The recognition unit 3002 supplies the color conversion section 3003 with the RGB signal 3006, and also supplies the blacking processing section 3004 with a recognition signal 3007 indicating the image recognition result based on the signal 3006. The color conversion section 3003 converts the RGB signal 3006 into a CMY signal 3008 and supplies it to the blacking processing section 3004. The blacking processing section 3004 selects a black ratio for a letter image or for a photograph image on the basis of the recognition signal 3007. Specifically, the section 3004 selects a black ratio for a letter image when copying a letter image, and a black ratio for a photograph image when copying a photograph image. As a result, the blacking processing section 3004 converts the CYM signal 3008 into a C'M'Y'K' signal and supplies it to the printer engine 3005.

Figure 21:
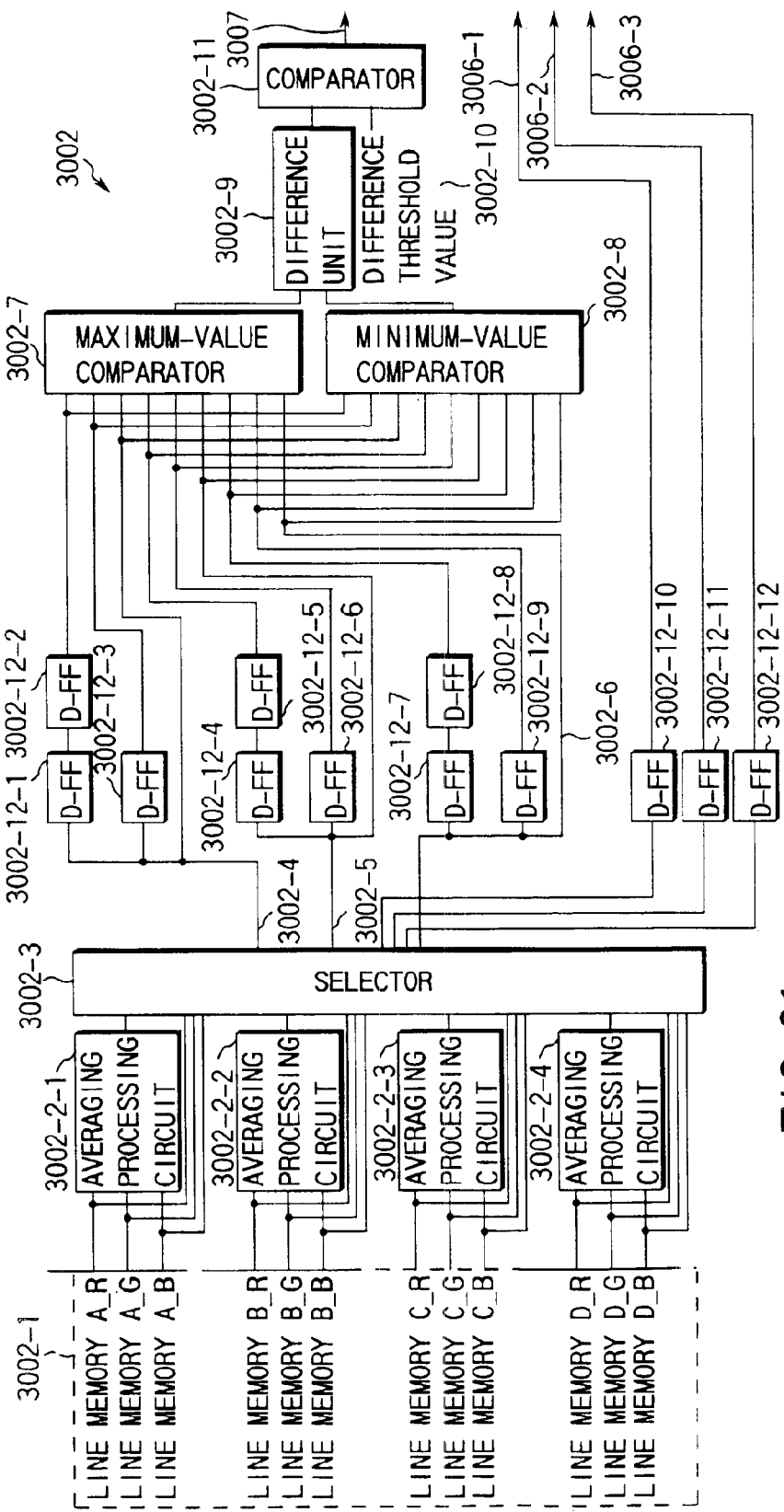
FIG. 21 is a schematic view illustrating a recognition unit incorporated in the image processing apparatus of the third embodiment of the invention.

FIG. 21 shows an example of the recognition unit 3002. The recognition unit 3002 includes a line memory 3002-1, averaging circuits 3002-2-1–3002-2-4, a selector 3002-3, D-FFs 3002-12-1–3002-12-12, a maximum value comparator 3002-7, and minimum value comparator 3002-8, a difference unit 3002-9 and a comparator 3002-11.

Figure 22:
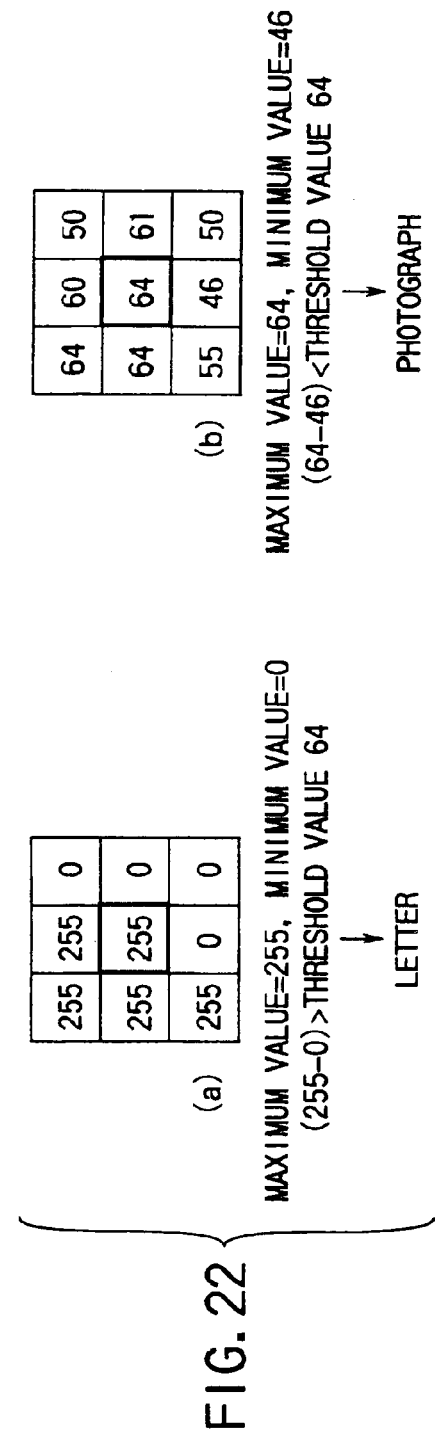
FIG. 22 is a view useful in explaining recognition processing executed by the recognition unit incorporated in the image processing apparatus of the third embodiment.

As shown in FIG. 22, the recognition unit 3002 compares (a maximum value–a minimum value) in a (3×3) matrix that consists of the average values of RGB signal components, with a difference threshold value 3002-10, thereby determining the type of each document image. If it is determined as a result of comparison that (a maximum value–a minimum value) is higher than the difference threshold value, i.e. if the degree of change is high, it is determined that the image is a letter image. On the other hand, if (a maximum value–a minimum value) is lower than the difference threshold value, i.e. if the degree of change is low, it is determined that the image is a photograph image. The line memory 3002-1 stores data in units of one line, and the averaging circuit 3002-2 calculates the average values of the RGB signal components. The selector 3002-3 outputs a signal for selecting three lines of the four lines of the averaging results and not-yet averaged data.

This structure enables processing of raster data without stopping the operation of the scanner 3001. Data of each line is output to the maximum value comparator 3002-7 and the minimum value comparator 3002-8. The difference unit 3002-9 obtains the difference between the data of the maximum value comparator 3002-7 and that of the minimum value comparator 3002-8. The comparator 3002-11 compares the difference with the difference threshold value 3002-10. If the difference is higher than the threshold value, the comparator 3002-11 determines that the image is a letter image and imparts "1" to the recognition signal 3007. If the difference is lower than the threshold value, the comparator 3002-11 determines that the image is a photograph image and imparts "0" to the recognition signal 3007.

Figure 23:
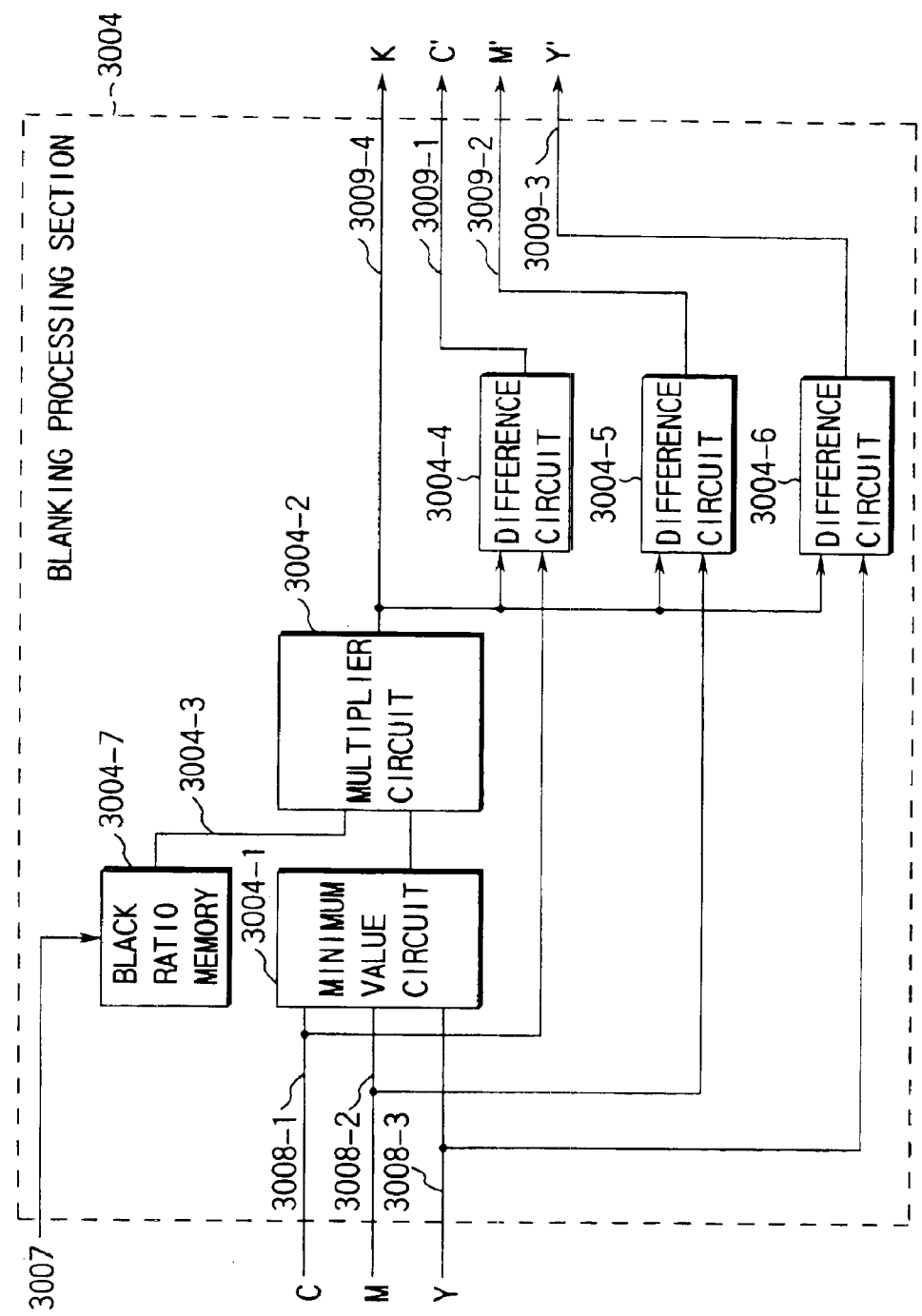
FIG. 23 is a schematic block diagram showing a blacking processing section incorporated in the image processing apparatus of the third embodiment.

FIG. 23 shows an example of the blacking processing section 3004. The blacking processing section 3004 includes a minimum value circuit 3004-1, a multiplier circuit 3004-2, difference units 3004-4–3004-6 and black ratio memory 3004-7.

This example is similar to the first embodiment except that a black ratio k3004-3 for a letter image or a black ratio k3004-3 for a photograph image is read from the black ratio memory 3004-7 on the basis of the recognition signal 3007 output from the recognition unit 3002.

The color conversion section 3003 is similar to that employed in the modification of the second embodiment. The operation as illustrated in FIG. 24 will be described, using the values shown in FIG. 17.

Figure 24:
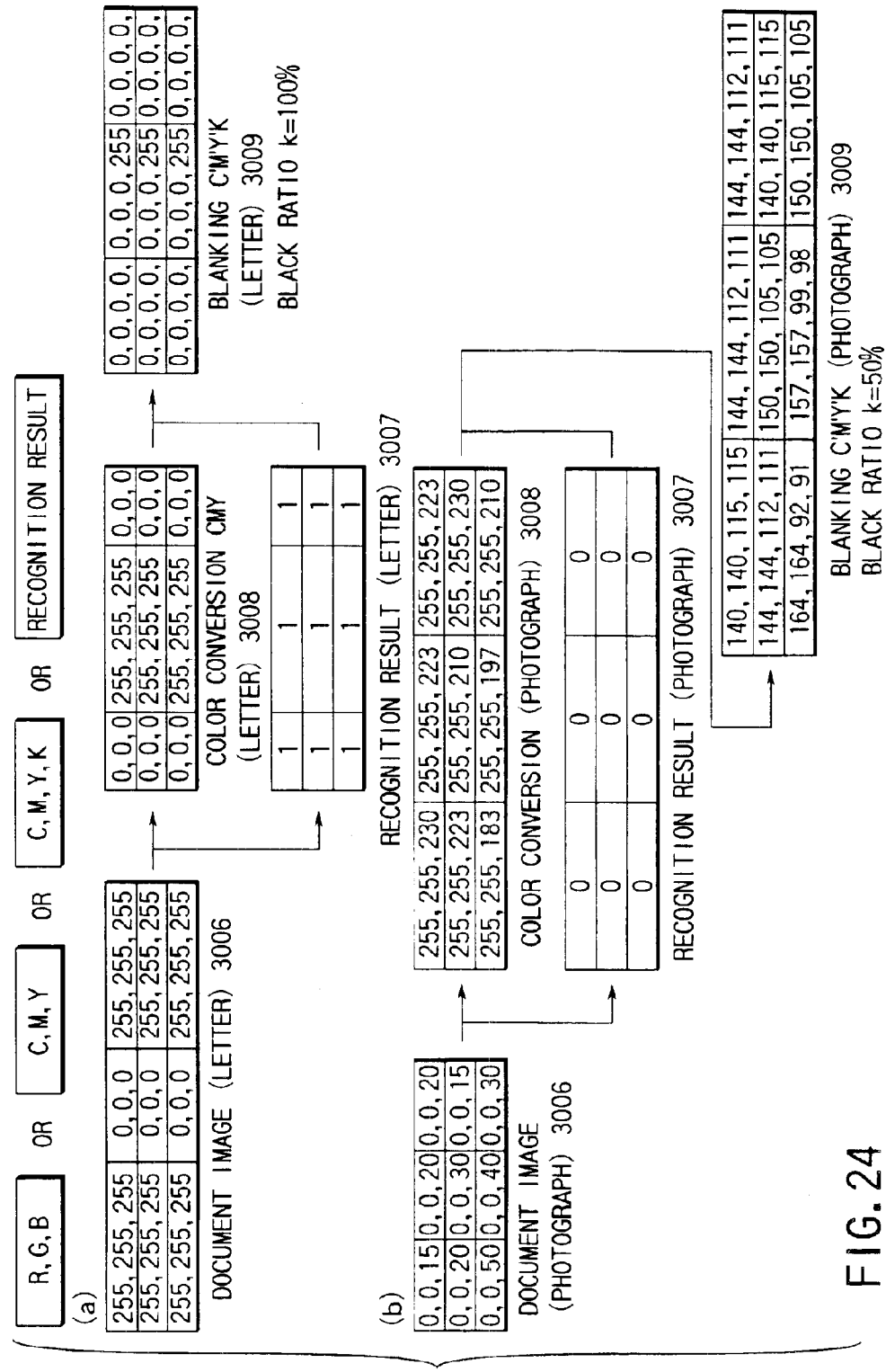
FIG. 24 is a view useful in explaining recognition processing, color conversion processing and blacking processing executed in the image processing apparatus of the third embodiment.

FIG. 24 is a view useful in explaining the switching of the black ratio between a letter image and a photograph image. As shown (a) of FIG. 24, a black letter, for example, is liable to be copied only using K, and hence can be copied in solid black. On the other hand, as shown in (b) of FIG. 24, a photograph, for example, is copied using a small amount of K, and hence their tints can be kept.

Since as described above, the black ratio is changed between a letter image and a photograph image in the third embodiment, appropriate color reproduction can be executed for the images.

Although in the third embodiment, the black ratio is changed, using a single blacking system, similar image quality improvement can be attained by using different blacking systems. Suppose, for example, that the blacking processing section 3004 executes blacking processing by selectively using two types of blacking systems (UCR and GCR), and that the switching of the blacking systems is based on a recognition signal output from the recognition unit 3002. If, for example, the recognition unit 3002 determines that an image corresponding to an image signal output from the scanner 3004 is a letter image, the blacking processing section 3004 executes blacking processing using UCR as the blacking system. If, on the other hand, it is determined that the image is a photograph image, the blacking processing section 3004 selects GCR USR as the blacking system and executes blacking processing. In other words, UCR in which black is expressed using a single color (K) is employed in the case of a letter image, while GCR in which chroma is maintained is employed in the case of a photograph image. As a result, appropriate blacking processing is executed for each of a letter image and a photograph image, thereby improving image quality.

Since as described above, compression using a frequency conversion system is executed after blacking processing in the embodiments, the level of noise that occurs during blacking processing can be reduced by virtue of a filtering effect during compression, thereby further enhancing the compression efficiency.

Moreover, the color difference during compression and non compression can be minimized by using different color conversion systems, black ratios and blacking systems.

In addition, since the black ratio or the blacking system is changed by the recognition processing, depending upon the types of images, i.e. a letter image, a photograph image, letter images can be printed in solid black at low printing cost, and photograph images can be reproduced clearly.

Although the embodiments uses a blacking system for converting three signal components into four signal components, the conversion of three signal components into four signal components can be executed using a plurality of LUTs (Look Up Tables).

As described in detail, the invention provides an image processing apparatus capable of minimizing image degradation due to compression processing and blacking processing, capable of compressing an image containing lots of achromatic portions at a high compression ratio, and capable of reducing the difference in quality between a compressed image and a non-compressed image at the time of signal conversion, thereby creating a high quality image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

color conversion means for converting a first color image signal that does not contain a black color component, into a second color image signal that does not contain a black component;

blacking processing means for adding a black component to the second color image signal to thereby create a third color image signal; and compression means for compressing the third color image signal on the basis of a frequency conversion system.

2. An image processing apparatus according to claim 1, further comprising:

decoding means for decoding the third color image signal compressed by the compression means, on the basis of the frequency conversion system; and image forming means for forming, on a predetermined medium, an image based on the third color image signal decoded by the decoding means.

3. An image processing apparatus according to claim 1, wherein:

the first color image signal is an RGB signal;

the second color image signal is a CMY signal; and the third color image signal is a C'M'Y'K' signal.

4. An image processing apparatus according to claim 1, wherein the third color image signal that has been compressed by the compression means creates a fourth color image signal, the image processing apparatus further comprising:

image processing means for selectively executing image processing on the fourth color image signal that has been compressed by the compression means, and for selectively executing image processing on the third color image signal that has not been compressed by the compression means.

5. An image processing apparatus comprising:

compression means for compressing a color image signal;

decoding means for decoding the color image signal compressed by the compression means; and image processing means for selectively executing image processing on the color image signal compressed by the compression means and then decoded by the decoding means, and image processing on a color image signal that has never been compressed, wherein the image processing means includes:

first color conversion means for converting a first color image signal compressed by the compression means, then decoded by the decoding means and containing no black component, into a second color image signal containing a black component on the basis of a first color conversion system; and second color conversion means for converting a first color image signal that has never been compressed and contains no black component, into a second color image signal containing a black component on the basis of a second color conversion system that differs from the first color conversion system.

6. An image processing apparatus according to claim 5, further comprising:

image reading means for reading a document and supplying a first color image signal corresponding to the document; and control means for causing, when a first mode is set, the first color image signal supplied from the reading means, to be compressed by the compression means, to be stored, to be decoded by the decoding means, and to be converted into the second color image signal by the first color conversion means, the control means also causing, when a second mode differing from the first mode is set, the first color image signal supplied from the reading means, to be converted into the second color image signal by the second color conversion means.

7. An image processing apparatus according to claim 6, wherein:

the first color image signal is an RGB signal;

the second color image signal is a CMYK signal;

the first mode is an electronic sorting copy mode; and the second mode is a normal copy mode.

8. An image processing apparatus comprising:

compression means for compressing a color image signal;

decoding means for decoding the color image signal compressed by the compression means; and image processing means for selectively executing image processing on the color image signal compressed by the compression means and then decoded by the decoding means, and image processing on a color image signal that has never been compressed, wherein the image processing means includes:

first blacking means for adding, at a first black ratio, a black component to a second color image signal created from a first color image signal that is compressed, then decoded and contains no black component, thereby creating a third color image signal; and second blacking means for adding, at a second black ratio differing from the first black ratio, a black component to a second color image signal created from a first color image signal that has never been compressed and contains no black component, thereby creating a third color image signal.

9. An image processing apparatus according to claim 8, further comprising:

image reading means for reading a document and supplying a first color image signal corresponding to the document;

color conversion means for converting the first color image signal into a second color image signal; and control means for causing, when a first mode is set, the first color image signal supplied from the reading means, to be compressed by the compression means, to be stored, to be decoded by the decoding means, to be converted into the second color image signal by the color conversion means, and to be converted into a third color image signal by the first blacking means, the control means also causing, when a second mode differing from the first mode is set, the first color image signal supplied from the reading means, to be converted into the second color image signal by the color conversion means, and then to be converted into the third color image signal by the second blacking means.

10. An image processing apparatus according to claim 9, wherein:

the first color image signal is an RGB signal;

the second color image signal is a CMY signal;

the third color image signal is a C'M'Y'K' signal;

the first mode is an electronic sorting copy mode; and the second mode is a normal copy mode.

11. An image processing apparatus comprising:

compression means for compressing a color image signal;

decoding means for decoding the color image signal compressed by the compression means; and image processing means for selectively executing image processing on the color image signal compressed by the compression means and then decoded by the decoding means, and image processing on a color image signal that has never been compressed, wherein the image processing means includes:

first blacking means for adding, on the basis of a first blacking system, a black component to a second color image signal created from a first color image signal that is compressed, then decoded and contains no black component, thereby creating a third color image signal; and second blacking means for adding, at a second blacking system differing from the first blacking system, a black component to a second color image signal created from a first color image signal that has never been compressed and contains no black component, thereby creating a third color image signal.

12. An image processing apparatus according to claim 11, further comprising:

image reading means for reading a document and supplying a first color image signal corresponding to the document;

color conversion means for converting the first color image signal into a second color image signal; and control means for causing, when a first mode is set, the first color image signal supplied from the reading means, to be compressed by the compression means, to be stored, to be decoded by the decoding means, to be converted into the second color image signal by the color conversion means, and to be converted into a third color image signal by the first blacking means, the control means also causing, when a second mode differing from the first mode is set, the first color image signal supplied from the reading means, to be converted into the second color image signal by the color conversion means, and then to be converted into the third color image signal by the second blacking means.

13. An image processing apparatus according to claim 12, wherein:
the first color image signal is an RGB signal;
the second color image signal is a CMY signal;
the third color image signal is a C'M'Y'K' signal;
the first mode is an electronic sorting copy mode;
the second mode is a normal copy mode; and
one of the first and second blacking systems is a UCR (Under Color Reduction) system, and the other of the first and second blacking systems is a GCR (Gray Component Removal) system.

14. An image processing apparatus for recognizing the type of an image on the basis of predetermined image data, and changing image processing to be executed on image data on the basis of the recognized type of the image, the image processing apparatus comprising:
recognition means for recognizing the type of an image corresponding to a first color image signal that contains no black component;
color conversion means for converting the first color image signal into a second color image signal that contains no black component;
first blacking means for adding, at a first black ratio, a black component to the second color image signal when the recognition means has recognized that the first color image signal indicates a letter image, thereby creating a third color image signal; and
second blacking means for adding, at a second black ratio differing from the first black ratio, a black component to the second color image signal when the recognition means has recognized that the first color image signal indicates a photograph image, thereby creating a third color image signal.

15. An image processing apparatus according to claim 14, wherein:
the first color image signal is an RGB signal;
the second color image signal is a CMY signal; and
the third color image signal is a C'M'Y'K' signal.

16. An image processing apparatus for recognizing the type of an image on the basis of predetermined image data, and changing image processing to be executed on image data on the basis of the recognized type of the image, the image processing apparatus comprising:
recognition means for recognizing the type of an image corresponding to a first color image signal that contains no black component;
color conversion means for converting the first color image signal into a second color image signal that contains no black component;
first blacking means for adding, on the basis of a first blacking system, a black component to the second color image signal when the recognition means has recognized that the first color image signal indicates a letter image, thereby creating a third color image signal; and
second blacking means for adding, on the basis of a second blacking system differing from the first blacking system, a black component to the second color image signal when the recognition means has recognized that the first color image signal indicates a photograph image, thereby creating a third color image signal.

17. An image processing apparatus according to claim 16, wherein:
the first color image signal is an RGB signal;
the second color image signal is a CMY signal;
the third color image signal is a C'M'Y'K' signal;
the first mode is an electronic sorting copy mode;
the second: mode is a normal copy mode; and
one of the first and second blacking systems is a UCR (Under Color Reduction) system, and the other of the first and second blacking systems is a GCR (Gray Component Removal) system.

* * * * *